United States Patent [19]

Young

[11] 4,397,675
[45] Aug. 9, 1983

[54] METHOD OF PRODUCING UREA-SULFURIC ACID REACTION PRODUCTS

[75] Inventor: Donald C. Young, Fullterton, Calif.

[73] Assignee: Union Oil Company of California, Los Angeles, Calif.

[21] Appl. No.: 318,343

[22] Filed: Nov. 5, 1981

[51] Int. Cl.³ ................................................ C05C 9/00
[52] U.S. Cl. .......................................... 71/28; 71/40; 71/43; 71/64.08; 564/63; 564/73; 564/75
[58] Field of Search ............................... 71/11, 27–30, 71/40, 43, 64.08, 64.09, 64.10; 564/39, 63, 73, 75

[56] References Cited

U.S. PATENT DOCUMENTS

| | | | |
|---|---|---|---|
| 1,884,105 | 10/1932 | Moore | 423/549 |
| 3,459,499 | 8/1969 | Mullen, Jr. | 423/313 |
| 4,116,664 | 9/1978 | Jones | 71/29 |
| 4,310,343 | 1/1982 | Verdegaal et al. | 564/63 X |

OTHER PUBLICATIONS

D. F. du Toit, Verslag Akad. Wetenschappen, 22, 573–574 (abstracted in Chemical Abstracts, 8, 2356, 1914).

L. H. Dalman, "Ternary Systems of Urea and Acids, I: Urea, Nitric Acid and Water, II: Urea, Sulfuric Acid and Water, III: Urea, Oxalic Acid and Water; *JACS*, 56, 549–593 (1934).

Sulfur Institute Bulletin, No. 10 (1964), "Adding Plant Nutrient Sulfur to Fertilizer".

William Lohry, "Techniques of Manufacturing Hot Mix Suspensions", *National Fertilizers Association*, Round-Up Papers, (1968), pp. 34–38.

Primary Examiner—Ferris H. Lander
Attorney, Agent, or Firm—Dean Sandford; Gregory F. Wirzbicki; Michael H. Laird

[57] ABSTRACT

Stable, urea-sulfuric acid reaction products of predetermined composition containing mono- and/or diurea sulfates and less than 35 weight percent water are produced from concentrated, urea-sulfuric acid reaction product feeds of different compositions by simultaneously and separately adding a selected feed solution and reactant urea and/or sulfuric acid, and optionally water, to a reaction zone in stoichiometric proportions so that the composition of the total feed to the reaction zone corresponds to the predetermined composition. Reaction temperature is maintained at a level below the incipient decomposition temperature of the predetermined composition, and the resulting products are essentially or completely free of sulfamic acid and/or ammonium sulfamate. Depending upon the relative proportions of unreacted sulfuric acid and urea in the total feed, the reaction may be exothermic or endothermic and, when desired, the otherwise endothermic reactions can be made exothermic by the reaction of excess urea and sulfuric acid to autogenously maintain the desired reaction temperature.

18 Claims, 5 Drawing Figures

FIGURE 3

FIGURE 5
EFFECT OF TEMPERATURE AND REACTION MEDIUM ON THE RATE CONSTANT, k, FOR REACTION OF GRANULAR UREA

METHOD OF PRODUCING UREA-SULFURIC ACID REACTION PRODUCTS

BACKGROUND OF THE INVENTION

1. Field of the Invention

This invention relates to the field of urea-sulfuric acid reaction products, and particularly to methods of converting concentrated urea-sulfuric acid reaction products of one composition to products of differing urea/sulfuric acid weight ratio. These methods permit the conversion of urea/sulfuric acid reaction products of essentially any composition to products of essentially any other composition with sufficient control of reaction parameters to consistently maintain a predetermined product composition and crystallization temperature while avoiding incipient product and/or reactant decomposition and potentially explosive autocatalytic decomposition associated with the more highly exothermic conversions. The invention also relates to the direct production of the desired product from urea, sulfuric acid, and optionally water, simultaneously with the inverconversion of the feed solution, and to the use of a unique direct air heat exchange process for cooling the reacting liquid phase without significant emissions to the atmosphere.

2. Description of the Prior Art

Urea is widely used as a topical, sub-surface and foliar fertilizer. Sulfuric acid has also been widely used in the agricultural industry and in other industries for numerous purposes. It is known to be highly corrosive both to metals and animal tissue, including human skin. In the agricultural industry, sulfuric acid has been used as a soil adjuvant, a water penetration improving agent, a herbicide for a wide variety of undesired vegetation, and as a selective herbicide on resistant crops such as onions and garlic.

Previous investigators have observed that urea and sulfuric acid can be reacted to form products containing mono- and/or diurea sulfates. This reaction is highly exothermic, which makes it difficult to control reaction temperature in large volume production plants with available methods. The exotherm makes it essentially impossible to control reaction temperature in the formulation of the higher acid content compositions, e.g., where the ratio of sulfuric acid to urea is about 1 or greater. Furthermore, previous investigators did not recognize either the magnitude or importance of incipient product and/or reactant decomposition, or the temperatures at which such decomposition occurs for products having different urea/sulfuric acid ratios. Their methods were not adequate to avoid incipient decomposition, particularly in the higher acid compositions, and they did not recognize the effect of such decomposition on process control or product quality.

D. F. du Toit found that urea formed certain compounds with oxalic, acetic, hydrochloric, nitric and sulfuric acids, and that the resulting compounds were stable in contact with their solutions at 20° C. Verslag Akad. Wetenschappen, 22, 573-4 (abstracted in Chemical Abstracts, 8, 2346, 1914).

L. H. Dalman expanded on du Toit's work by developing the phase relationships between the solid phase and saturated solutions at 10° C. and 25° C. but, as in the case of du Toit, did not develop or disclose methods capable of handling the high exothermic heat of reaction involved in large scale industrial processing. "Ternary Systems of Urea and Acid. I. Urea, Nitric Acid and Water. II. Urea, Sulfuric Acid and Water. III. Urea, Oxalic Acid and Water"; JACS, 56, 549-53 (1934).

In the article "Adding Plant Nutrient Sulfur to Fertilizer", Sulfur Institute Bulletin No. 10 (1964), the Sulfur Institute discussed the addition of nutrient sulfur to fertilizers and mentioned that urea reacts with sulfuric acid to form complexes which are useful in fertilizers.

Jones, in U.S. Pat. No. 4,116,664, disclosed what is referred to therein as a tortuous, multistage process of producing combinations of urea and sulfuric acid in which portions of the sulfuric acid are incrementally added to and reacted with the total amount of urea to be reacted in each of several stages until the total amount of sulfuric acid has been reacted with the urea. The resulting product is unstable and requires further processing. Jones preferably adds water later as required to obtain stability and the desired composition. He discloses that the reaction can be carried out at temperatures of 100° to 225° F., and that if the sulfuric acid is added to the total amount of urea at a rate which is too fast, the temperature goes to about 200° to 225° F. and that a gas is emitted that causes changes in product characteristics such as solidification. The patent states that temperatures of 160° to 200° F. are preferred.

Other writers have discussed methods for controlling the heat of reaction in highly exothermic systems such as the urea-sulfuric acid reaction described in du Toit, Dalman, and Jones. For instance, William Lohry, "Techniques of Manufacturing Hot Mix Suspensions", National Fertilizers Solutions Association "Round-Up Papers", pages 34-38 (1968), discloses that the exothermic heat of reaction of ammonia with concentrated phosphoric acid can be controlled by either internal or external cooling of the reactants in the reaction vessel, and that it is usually desirable to provide a heel of reaction product in the vessel before adding reactants to prevent drastic variations in product pH.

In U.S. Pat. No. 1,884,105, H. C. Moore discloses a method for producing salts of sulfuric acid, e.g., by reacting concentrated sulfuric acid with liquid anhydrous ammonia, in which control of the highly exothermic reaction is assisted by adding an initial inventory of product to the reaction zone before reactant addition. In Moore's process the total amount of sulfuric acid to be reacted is mixed with a quantity of ammonium sulfate previously produced and that mixture is then reacted with liquid anhydrous ammonia.

Similarly, in U.S. Pat. No. 3,459,499, G. C. Mullen, Jr., discloses a process for ammoniating superphosphoric acid in which, according to Mullen, temperatures are effectively controlled, and diminished product quality associated with excessive reaction temperatures is avoided, in part, by providing, in the reaction zone, a large body of ammonium phosphate product solution followed sequentially by the introduction of the relatively small quantities of ammoniating fluid and phosphoric acid.

Although these investigators disclosed several characteristics of urea-sulfate combinations, methods of making those combinations and, in general, methods of controlling exothermic reactions, they did not recognize either the magnitude or significance of the incipient decomposition temperature in large volumes of reacting urea and sulfuric acid. Nor did they appreciate that incipient decomposition temperature varies with composition, i.e., with the ratio of urea, sulfuric acid and water in the reaction phase, or the effect that exceeding the incipient decomposition temperature has on product composition. They also did not devise or appreciate the need for process conditions required to achieve acceptable reaction rates in large volumes of reacting urea and sulfuric acid while preventing either gross or localized overheating to temperatures in excess of the incipient decomposition temperatures.

The prior art also did not disclose that concentrated urea-sulfuric acid reaction products can be interconverted to products having different concentrations of urea, sulfuric acid or water. Nor did it teach procedures by which such interconversions could be achieved efficiently or the advantages that product interconversion affords in the manufacture of these compositions.

Methods of producing concentrated urea-sulfuric acid reaction products directly from urea, sulfuric acid and, optionally, water are disclosed in my copending application, Ser. No. 318,629, filed Nov. 5, 1981, the disclosure of which is incorporated herein by reference.

It has now been discovered that concentrated urea-sulfuric acid reaction products, such as those disclosed in said copending application, can be interconverted to products of different composition by the methods disclosed herein.

It is therefore one object of this invention to provide an improved method for the production of urea-sulfuric acid reaction products.

Another object of this invention is to provide a method for converting urea-sulfuric acid reaction products to products of different composition.

Yet another object is the provision of a method for interconverting urea-sulfuric acid reaction products to products of different composition in relatively large volumes while maintaining reaction temperature below the product and reactant incipient decomposition temperature, and maintaining the reactant composition and product crystallization temperature at predetermined values.

Yet another object of this invention is the provision of a method for autogenously maintaining a desired reaction temperature during the interconversion of urea-sulfuric acid reaction products to products of different composition in which the interconversion per se is not sufficiently exothermic to maintain reaction temperature.

Another object of this invention is the provision of a continuous method for interconverting urea-sulfuric acid reaction products to products of different composition.

Yet another object is the provision of an improved method for removing excess heat from, and thus maintaining the desired reaction temperature of the reaction phase in the conversion of urea-sulfuric acid reaction products to products of different composition.

Another object of this invention is the provision of a method for the interconversion of urea-sulfuric acid reaction products to products of different composition free of reaction by-products.

Yet another object of this invention is the provision of a method for the interconversion of urea-sulfuric acid reaction products to products of different urea/sulfuric acid ratio that increases plant production capacity.

Other objects, aspects and advantages of this invention will be apparent to one skilled in the art in view of the following disclosure, the drawings and the appended claims.

SUMMARY OF THE INVENTION

This invention relates to methods of converting concentrated urea-sulfuric acid reaction products to products of different composition in which reaction temperature is continuously maintained below the incipient decomposition temperature of the feed and product solutions to prevent the formation of undesired by-products and to prevent explosive autocatalytic decomposition. These methods also provide for additional exothermic heat of reaction in the reaction zone when required to autogenously maintain reaction temperature, and for the continuous maintenance of predetermined product and reactant phase characteristics such as composition and crystallization temperature.

In accordance with one embodiment of this invention, a concentrated urea-sulfuric acid reaction product of predetermined composition is produced by continuously and simultaneously feeding to a reaction zone a feed solution of a concentrated urea-sulfuric acid reaction product having a composition different from that of said predetermined composition, along with the reactants urea, sulfuric acid and/or water, in stoichiometric proportions such that the composition of the total feed to the reaction zone corresponds to the predetermined product composition. The reaction zone must contain an amount of the predetermined composition sufficient to prevent the formation of off-specification product and, in continuous processes, to prevent the discharge of off-specification product from the reaction zone.

In accordance with another embodiment, the interconversion of the urea-sulfuric acid feed to the desired product of predetermined composition is conducted in the presence of sufficient unreacted sulfuric acid and urea to produce an exothermic reaction within the reaction zone sufficient to autogenously maintain a reaction temperature of at least about 120° F.

In accordance with another embodiment of this invention, a portion of the reacting liquid phase within the reaction zone is cooled by direct contact with ambient air and returned to the reaction zone to maintain the desired reaction temperature.

In accordance with yet another embodiment of this invention, the interconversion is conducted continuously by continuously and separately introducing into a reaction zone, the feed solution and urea and/or sulfuric acid (and water if required), in stoichiometric proportions correlated with the differences between the feed composition and the predetermined composition, and continuously withdrawing product of the predetermined composition from the reaction zone at a rate at least approximating the total feed rate to the reaction zone.

BRIEF DESCRIPTION OF THE DRAWINGS

The invention will be more readily understood by reference to the drawings of which.

DETAILED DESCRIPTION OF THE INVENTION

The compositions produced by the methods of this invention, and those employed as feed solutions, are clear, homogeneous reaction products of urea, sulfuric acid and, optionally, water. Water may be present in very minor amount or may be omitted entirely in some compositions as illustrated in the ternary phase diagram of FIG. 1. These compositions usually comprise about 5 to about 75 weight percent, preferably at least 10 to about 70 weight percent urea; about 5 to about 85 weight percent, preferably about 10 to about 80 percent sulfuric acid; and about 0 to about 35, usually less than about 25, and preferably less than about 15 weight percent water. Urea and sulfuric acid, in combination, will usually comprise at least about 65 weight percent, generally at least about 75 weight percent, and preferably at least about 85 weight percent of the product solution.

The four digit designations for product and feed compositions used herein, e.g., 18-0-0-17, are conventionally used in the agricultural industry to designate the concentration of nitrogen, phosphorus (as $P_2O_5$), potassium (as $K_2O$), and a fourth component—in this case sulfur expressed as the element. Thus, the composition 18-0-0-17 contains 18 weight percent nitrogen derived from urea and 17 weight percent sulfur derived from sulfuric acid. Using the atomic weights of nitrogen (14) and sulfur (32) and the molecular formulas and molecular weights for urea (60.06) and sulfuric acid (98.08) it can be readily determined that this formulation contains 38.6 weight percent urea and 52.1 weight percent sulfuric acid. By difference, the solution contains 9.3 weight percent water. The composition of all other products and feed solutions can be determined by the same procedure.

Figure 1:
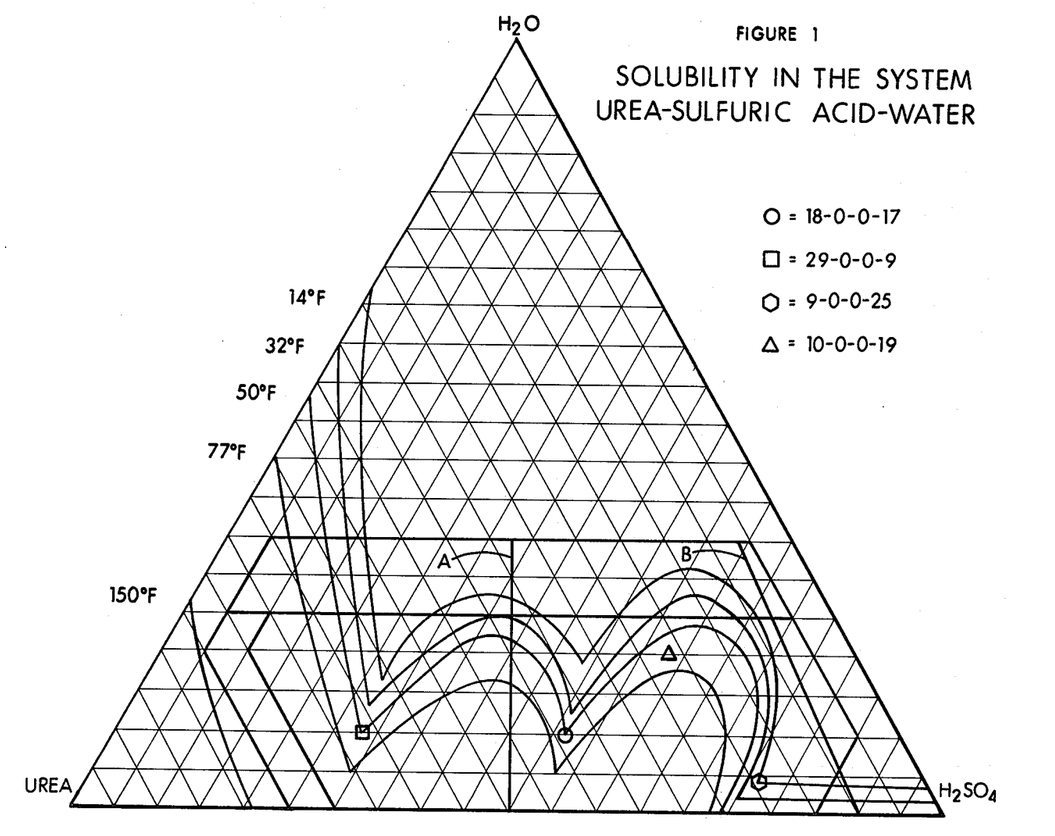
FIG. 1 is a ternary phase diagram for the urea, sulfuric acid, and water system illustrating isotherms at several temperatures, the existence of three prominent eutectics, and the compositions preferred for use in the methods of this invention as indicated by the bold line boundaries.

The composition and some of the physical properties of the feed solutions and products involved in these methods are illustrated by the ternary phase diagram of FIG. 1. The phase diagram defines the relative proportions in weight percents for each of the three components—urea, sulfuric acid, and water—at any point within the diagram. At each apex of the triangle the system consists completely of the indicated component. Thus, the urea concentration at the urea apex is 100 percent and diminishes linearly to 0 along a straight line from the urea apex to the midpoint of the $H_2OH_2SO_4$ boundary line, i.e., the side of the triangle opposite the urea apex. The same is true of the remaining two components: water and sulfuric acid.

The diagram also illustrates the isotherms for the system at 14° F., 32° F., 50° F., 77° F., and 150° F. The 150° F. isotherm is illustrated only partially at the lower left-hand portion of the diagram. Each isotherm defines compositions which, if cooled below the temperature indicated for the respective isotherm, will precipitate components of the system. However, the solutions will super-cool dramatically, e.g., by as much as 50° F., or more, under quiescent conditions in the absence of seed crystals, impurities, etc. that promote crystallization.

As indicated by the pattern of the isotherms, systems having a fixed ratio of urea to sulfuric acid become more stable at lower temperatures as the water concentration is increased. This is true throughout most of the phase diagram with the exception of the region in the vicinity of the higher acid eutectic in the lower right-hand portion of the phase diagram.

Three prominent eutectics are apparent within the region of the illustrated isotherms. Each eutectic represents a discontinuity in the response of the system, e.g., of crystallization point, to changes in solute concentration, and indicates the point of maximum solute concentration for a given isotherm in the region of the phase diagram associated with that eutectic.

As indicated in the legend on FIG. 1, the left-hand eutectic on the 50° F. isotherm corresponds to the formulation 29-0-0-9. The middle eutectic on the same isotherm corresponds to the composition 18-0-0-17. The right-hand eutectic on the 14° F. isotherm corresponds to the formulation 9-0-0-25, and the formulation intermediate the 50° F. and the 77° F. isotherms between the middle and right-hand eutectics indicated by a triangular designation corresponds to the formulation 10-0-0-19.

The dramatic discontinuities in these isotherms and their proximity to each other confirm the observation that minor variations in reactant phase or product composition can result in dramatic changes in crystallization temperature.

The bold lines within the diagram generally define the boundaries for formulations for which the methods of this invention are uniquely suited. Bold lines parallel to one side of the triangular diagram define a fixed concentration of the solute designated at the apex of the triangle opposite the side to which that line is parallel. Thus, the higher horizontal line in FIG. 1 borders the area of formulations containing 35 percent water or less and varying amounts of urea and sulfuric acid. The area below the lower horizontal line defines formulations containing 25 weight percent water or less.

Vertical line A in the center of the diagram intersecting the urea-sulfuric acid line at the half-way point defines compositions having a one-to-one weight ratio of urea to sulfuric acid. If extended vertically, line A would intersect the water apex. The area to the right of vertical line A defines formulations having $H_2SO_4$/urea weight ratios of 1 or greater. The angular line B in the lower right-hand portion of the diagram intersects the urea-$H_2SO_4$ boundary at the 90 percent sulfuric acid—10 percent urea point and, if extended, would intersect the water apex. Thus, it represents formulations having a 9:1 weight ratio of sulfuric acid to urea.

Figure 2:
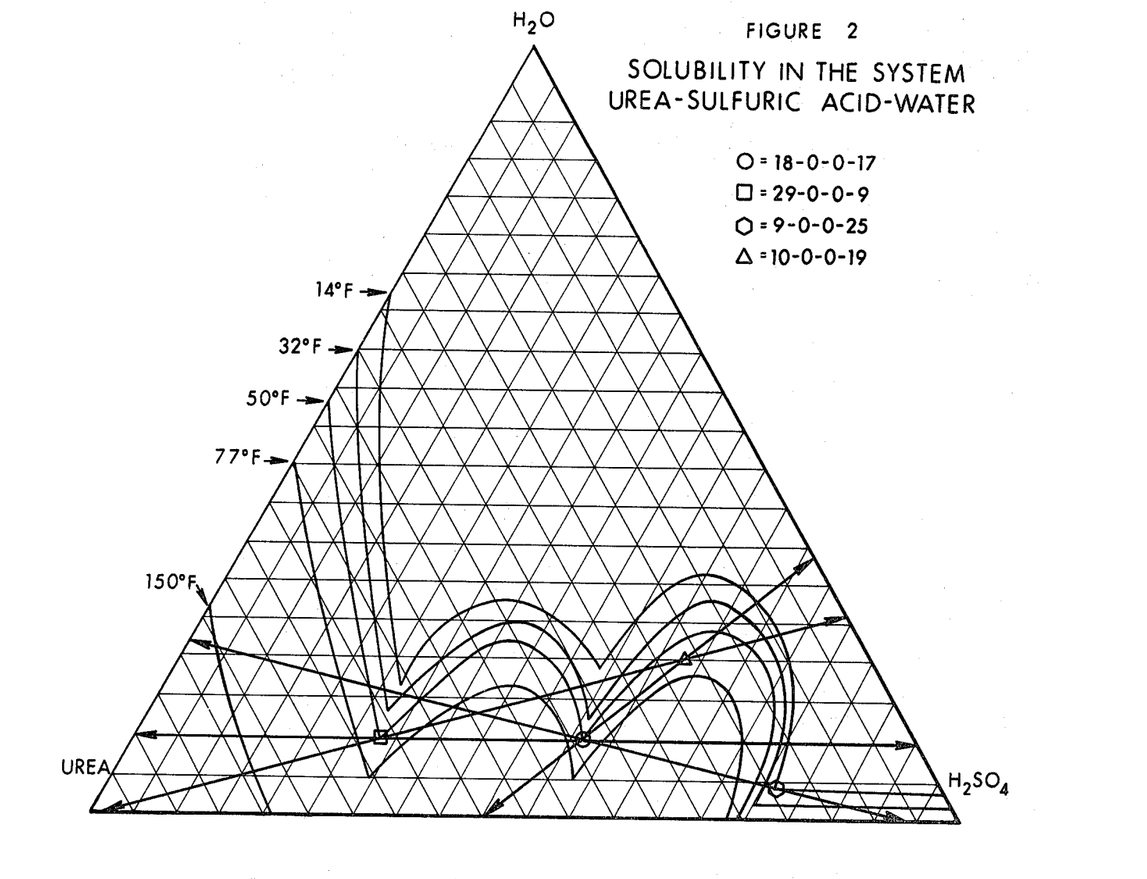
FIG. 2 is the ternary phase diagram of FIG. 1 absent the composition boundaries illustrating, by the straight bold lines, the interrelationships between several feeds and predetermined product compositions that can be interconverted.

FIG. 2 is a duplicate of the ternary phase diagram of FIG. 1 illustrating the several isotherms and the interrelationship between several preferred products that can be interconverted by the methods described herein. The bold straight lines passing through the points designating the several illustrated product and feed compositions illustrate paths along which the interconversion might take place. However, due to the characteristics of this system, those paths cannot be followed; the reaction mixture of product, feed solution, and unreacted urea, sulfuric acid and/or water, would "set up" in the reaction zone. For instance, when equal volumes of 29-0-0-9 and 18-0-0-17 were mixed in a container, the mixture rapidly solidified to a rigid solid that had to be chiseled out of the container. Thus, a composition intermediate the composition of those two products cannot be produced by simply mixing those two products in appropriate amounts. Also, neither one of those products can be converted to the other by sequential admixture of the required feeds. All feeds must be added simultaneously and in stoichiometric proportions to an inventory of product as discussed above.

The bold lines intersecting the designated composition points in FIG. 2, when extended to the boundaries of the phase diagram, indicate which of the two components of the mixture must be added to the feed solution designated by one point on the line, to convert it to the predetermined product designated by the second point on the straight line. For instance, the conversion of a 9-0-0-25 feed solution to an 18-0-0-17 product requires the interreaction of the 9-0-0-25 feed with both urea and water in the presence of 18-0-0-17 as indicated by the extension of the common line for these two formulations from the feed composition through the product composition to the phase diagram urea-$H_2O$ boundary. Similarly, the interconversion of 10-0-0-19 to 18-0-0-17 requires the reaction of a 10-0-0-19 feed solution with urea and sulfuric acid in the presence of 18-0-0-17. Conversely, the interconversion of 18-0-0-17 to 10-0-0-19 requires the reaction of 18-0-0-17 with sulfuric acid and water in the presence of 10-0-0-19 as indicated by the intercept of the straight line from the 18-0-0-17 point through the 10-0-0-19 composition at the $H_2O$-$H_2SO_4$ boundary.

In some situations the interconversion line through the feed solution and predetermined product composition points on the ternary phase diagram will intercept the boundary of the diagram at the apex of one of the three components indicating that the conversion can take place in one direction by the addition of only one of the three components.

In no case is it necessary to add all three components to a feed solution in order to convert it to a predetermined product. However, the addition of all three components is preferred in some cases to carry out direct production of the predetermined composition simultaneously with the interconversion of the feed solution to the product as discussed in more detail hereinafter.

The proportions of feed solution and reactants required for interconversion or a combination of interconversion and direct production can best be determined by material balance as discussed later.

The process of this invention can be conducted on either a batch or continuous basis in either one or more reaction zones by simultaneously and separately feeding to the reaction zone (1) a feed solution of a urea-sulfuric acid reaction product having a composition within the ranges described above, and a urea/sulfuric acid ratio different from that of the predetermined product composition, and (2) a reactant selected from urea, sulfuric acid, and, optionally, water, or combinations thereof, in which at least one component of the reactant is urea or sulfuric acid.

The reactants and feed solution are passed to the reaction zone at feed rates correlated with the differences in the concentrations of urea, sulfuric acid and water between the feed solution and the product composition, so that the total feed to the reaction zone has a composition corresponding to the predetermined product composition.

The combination of feeds is rapidly and continuously mixed in the reaction zone with an inventory of product composition or reacting liquid phase which has a composition corresponding to that of the product composition. The volume of the inventory corresponds to at least one-tenth the hourly feed rate of the total feed to the reaction zone. The reacting liquid phase formed by the admixture of the total feed to the reaction zone inventory is continually maintained at a temperature sufficient to promote an acceptable reaction rate, e.g., at least about 120° F., and below the incipient decomposition temperature of both the feed solution and product composition.

The continuous process is presently preferred since it affords improved process stability and better control of reaction temperature and product composition, crystallization point and corrosivity.

Figure 3:
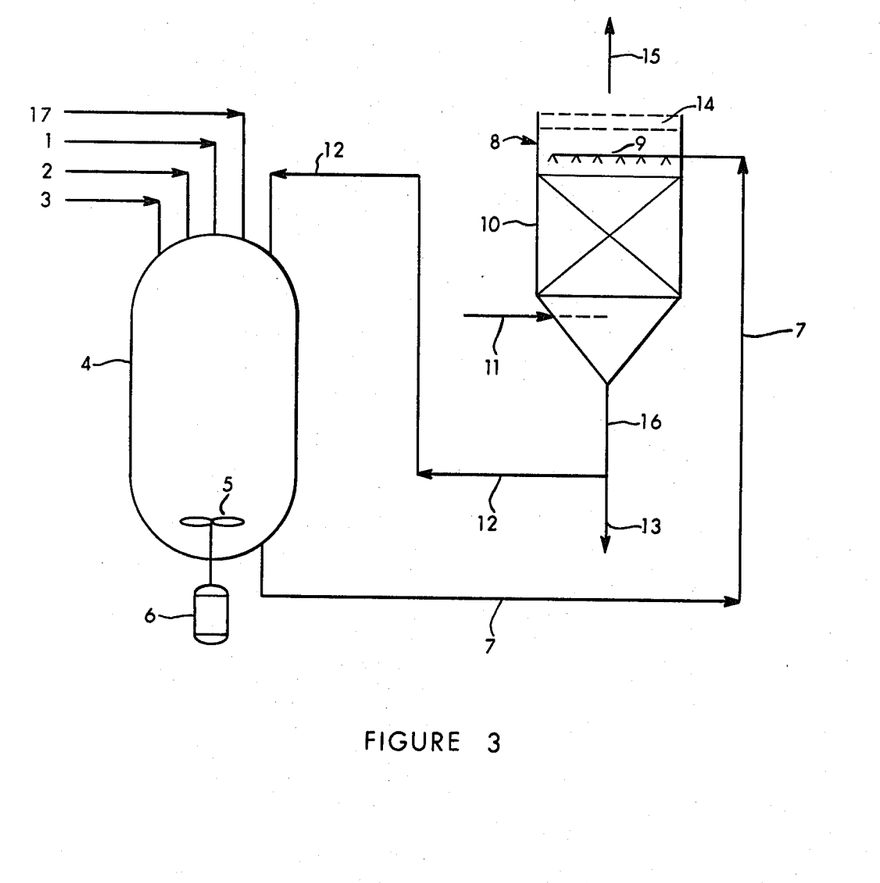
FIG. 3 is a schematic illustration of an apparatus and process flow system suitable for use in one embodiment of this invention.

The process can be better understood by reference to FIG. 3 which is a schematic illustration of one embodiment of the preferred, continuous method employing countercurrent direct air heat exchange. The urea-sulfuric acid reaction product feed solution is continuously introduced to reactor 4 via line 17, and solid urea, water and sulfuric acid are added, as required by stoichiometry, simultaneously and continuously through pipes 1, 2, and 3. The reactor is provided with agitating means such as impeller 5 driven by motor 6 adequate to assure rapid mixing of the reactants and feed solution with the volume of reacting liquid phase within reactor 4.

The reacting liquid phase is continuously passed from reactor 4 through pipe 7 to spray nozzles 9 in the direct air heat exchanger 8. Ambient air or cooled air is introduced to the lower portion of the heat exchanger through pipe 11 or other means, and passes upwardly through packed section 10 into direct contact with downward flowing liquid phase. Following contact with the liquid phase, the warmed air passes through demister section 14 and can be discharged directly to the atmosphere. Even at elevated temperatures very little sulfate is present in the effluent air. Cooled product is removed from heat exchanger 8 through pipe 16 and is either passed to storage via pipe 13 or is returned as cooling medium to reactor 4 by pipe 12.

Obviously, a number of various process schemes can be designed in view of the principles of operation discussed above. For instance, multiple reactors or multiple coolers can be provided, and the reactant feeds can be proportional between the multiple reaction vessels. Also, more conventional heat exchange means such as conventional tube or coil coolers can be employed in place of, or in addition to, the direct contact air cooler. However, the direct contact air cooler is particularly preferred since it mitigates corrosion and expedites heat exchange with the viscous reacting liquid phase and can be operated inexpensively with ambient air.

The reaction products of the interconversion will usually have crystallization temperatures below about 150° F., and must crystallize at temperatures below that at which the reaction is to be conducted. However, crystallization temperatures are usually below about 80° F., preferably less than about 50° F.; the lower crystallization temperature formulations being particularly preferred if the composition is to be used without dilution.

One unique advantage of the methods described herein is that they can consistently produce compositions containing precisely predetermined proportions of urea, sulfuric acid and water. This feature is of particular importance due to the fact that minor deviations in composition can dramatically affect crystallization temperature and can result in product solutions that crystallize at intolerably high temperatures. For instance, compositional differences as little as 2 percent in urea and sulfuric acid can change crystallization temperature by as much as 20° F. This difference could result in complete solidification of a product solution in transportation, processing or storage facilities. Accordingly, very accurate and continuous control of product quality is an essential aspect of the methods of this invention, particularly in the continuous process.

The incipient decomposition of any of these formulations results in the production of known toxic materials including ammonium sulfamate and sulfamic acid, and the temperature at which incipient decomposition occurs varies from product to product. For instance, the 29-0-0-9 formulation incipiently decomposes at about 159° F. and above, and thus should not be exposed to any temperature in excess of that point. If it is, system temperature may become uncontrollable and the product will contain minor, if not significant, amounts of sulfamic acid or ammonium sulfamate. Once decomposition begins in a large volume of inadequately cooled material, the reaction temperature can escalate rapidly, e.g., up to 600° F. and higher, and can result in explosion of the reactor and associated processing facility.

Reaction temperature should be maintained at a level sufficient to maintain an adequate conversion rate and thereby avoid inordinate holding time and/or the necessity of large reactor volumes. Reaction temperatures of at least about 100° F., preferably at least about 120° F., are usually adequate for this purpose. At the same time, as pointed out above, reaction temperature must be maintained below the incipient decomposition temperature. Incipient decomposition temperature varies significantly with composition as illustrated in the following table.

| Composition | Incipient Decomposition Temperature |
|---|---|
| 29-0-0-9 | 158° F. |
| 18-0-0-17 | 176° F. |
| 9-0-0-25 | 176° F. |
| 10-0-0-19 | 176° F. |

Incipient decomposition temperature can be determined by very gradually heating a solution of the designated composition until gas evolution is first observed. The incipient decomposition temperature of any formulation can be determined by this procedure. The evolved gas contains carbon dioxide and, in the absence of unreacted sulfuric acid, may also contain ammonia. In the presence of unreacted sulfuric acid, a condition that may exist in the reaction zone, the commencement of decomposition may produce ammonia, which then reacts very exothermically with sulfuric acid to increase solution temperature and heat load at a rate even faster than that occasioned by the sulfuric acid-urea reaction. This mechanism may be partially responsible for the observed autocatalytic composition of these solutions at elevated temperatures. As a general rule, the incipient decomposition temperatures for the urea-sulfuric acid compositions used in these methods range from about 155° F. to about 176° F. The higher decomposition temperatures are characteristic of compositions having $H_2SO_4$/urea ratios above about 1.

Accordingly, reaction temperatures should be within the range of 100° to about 176° F., usually about 120° to about 176° F., preferably about 125° F. to about 170° F., and most preferably about 130° to about 160° F.

The feed to the reaction zone should comprise at least about 10 weight percent, preferably at least about 20 weight percent, and usually about 20 to about 80 weight percent of the urea-sulfuric acid feed solution to be converted, based on the weight of the total feed to the reaction zone.

The urea-sulfuric acid feed solution will usually have a urea/sulfuric acid weight ratio at least about 10 percent and most often at least about 40 percent different than, i.e., greater or smaller than that of the product. For instance, a feed solution having a urea/sulfuric acid weight ratio of 1 will have a ratio twice as great as, i.e., 100 percent higher than a product having a ratio of 0.5.

The reactor feed should also comprise at least 10 weight percent and preferably at least about 20 weight percent of solid urea and/or concentrated sulfuric acid. These or greater feed concentrations of urea and sulfuric acid will usually be required to effect the interconversion desired. It should also be observed that when solid urea and concentrated sulfuric acid are simultaneously added to the reaction zone, they should be added separately in order to avoid any reaction prior to the admixture of those reactants with the reacting liquid phase in the reaction zone.

When the urea/sulfuric acid ratio in the feed solution is greater than that of the predetermined product, the total feed to the reaction zone must comprise the feed solution and concentrated sulfuric acid; under some circumstances it may also contain urea as discussed hereinafter. Conversely, if the urea/sulfuric acid ratio of the feed solution is less than that of the product, the total feed to the reaction zone must comprise the feed solution and solid urea, and may or may not contain sulfuric acid. As illustrated in the ternary phase diagram of FIG. 2, some interconversions also require the addition of water to the reaction zone. However, in no event does interconversion alone require the addition of all three reactants—urea, sulfuric acid and water.

As used herein, the term interconversion means the reaction of the urea-sulfuric acid feed solution with the minimum amounts of urea, sulfuric acid and/or water required to convert the feed solution of the desired product. The term direct production means the formation of an amount of the predetermined product by the reaction of stoichiometric amounts of urea, sulfuric acid and, optionally, water (if required in the predetermined composition), in addition to the amount that would result from the interconversion of the feed solution alone.

In some cases, it is preferable to conduct both interconversion and direct conversion simultaneously. Since some interconversions are endothermic, the preferred reaction temperatures cannot be obtained without an external heat supply. In one preferred embodiment of this invention, the necessary reaction temperatures are generated autogenously within the reaction zone by the reaction of unreacted urea and sulfuric acid. The heat of dissolution of urea and the heat of solution of sulfuric acid also influence reaction temperature as discussed more fully hereinafter.

As used herein, the term unreacted urea refers to solid urea fed to the reaction zone. The term unreacted sulfuric acid refers to either concentrated sulfuric acid fed independently to the reaction zone or sulfuric acid contained in the feed solution that has not been completely reacted with urea to form diurea sulfate. Thus, monourea sulfate and uncomplexed sulfuric acid contained in the feed solution constitute unreacted sulfuric acid and can contribute to the heat of reaction when unreacted urea is simultaneously fed to the reaction zone. However, unreacted sulfuric acid contained in the feed solution does not contribute to the heat of solution as does concentrated sulfuric acid added independently.

As a general rule, the total feed to the reaction zone should comprise at least about 10 weight percent, usually at least about 20 weight percent, and preferably about 20 to about 80 weight percent of each of unreacted urea and sulfuric acid. Some or all of the unreacted sulfuric acid may be present as sulfuric acid dissolved in the feed solution or contained in the feed solution as monourea sulfate.

The amount of unreacted sulfuric acid contained in the feed solution can be determined from the molar ratio of urea to sulfuric acid in that solution. If that ratio is 2 or greater, the feed solution will not contain unreacted sulfuric acid. If that ratio is less than 2, the feed solution will contain unreacted sulfuric acid and the amount of unreacted acid can be determined by subtracting the number of moles of urea divided by 2 from the number of moles of sulfuric acid contained in the feed solution to yield the number of moles of sulfuric acid available for reaction with urea.

The total feed composition for any interconversion or combination of interconversion and direct production can be calculated by material balance. For instance, the interconversion of 10-0-0-19 to produce 100 lbs. of 18-0-0-17 from urea containing 46 weight percent nitrogen and concentrated sulfuric acid containing 96 weight percent $H_2SO_4$, can be represented by the expression $$a(0.10N+0.19S+0.2046H_2O)+b(0.46)N+c[0.3207(0.94)S+0.06H_2O]=100\,(0.18N+0.17S+0.0942H_2O)$$

wherein the coefficients a, b, and c represent the pounds of 10-0-0-19, solid urea and concentrated sulfuric acid, respectively, that must be added to the reaction zone to produce 100 lbs. of 18-0-0-17. The straight line on the ternary phase diagram of FIG. 2 from the 10-0-0-19 composition point through the 18-0-0-17 composition point intersects the urea-$H_2SO_4$ boundary indicating that a combination of urea and sulfuric acid must be added to 10-0-0-19 to convert it to 18-0-0-17 and that additional water is not required for interconversion alone.

The overall mass balance is represented by the expression:

$$a+b+c=100.$$

The water balance is represented by the expression:

$$0.2046a+0.06c=9.42;$$

thus, $c=157-3.410a$.

The nitrogen balance is represented by the expression:

$$0.10a+0.46b=18;$$

thus, $b=39.13-0.2173a$.

Substituting the expressions for the coefficients b and c from the nitrogen and water balances, respectively, in the mass balance equation, the value of a is determined to be 36.59 lbs. Using the nitrogen and water balances, the values of the coefficients b and c are determined to be 31.18 lbs. and 32.23 lbs., respectively.

Thus, the straight interconversion of 10-0-0-19 to 18-0-0-17 requires the simultaneous and separate addition to the reaction zone of 36.59 lbs. of 10-0-0-19, 31.18 lbs. of solid urea containing 46 weight percent nitrogen, and 32.23 lbs. of 96 percent sulfuric acid. A sulfuric acid mass balance is not required for this determination but would simplify the determination of feed rates when the addition of water is required for the interconversion.

If it is also desired to carry out direct production in combination with the interconversion, the amount of solid urea, concentrated sulfuric acid and water that must be added in excess of that required for the interconversion, can be calculated from the stoichiometry of the end product.

Similarly, the relative amounts of feeds required to interconvert 18-0-0-17 to 10-0-0-19 can be determined by the procedures described above observing that the interconversion line on the ternary phase diagram of FIG. 2 from the 18-0-0-17 formulation to the 10-0-0-19 formulation intersects the $H_2O$-$H_2SO_4$ boundary. Thus, the interconversion requires the simultaneous addition of water and concentrated sulfuric acid. Using, for instance, solid urea containing 46 weight percent nitrogen and sulfuric acid containing 98 weight percent $H_2SO_4$, this interconversion would require the simultaneous addition of 55.55 weight percent 18-0-0-17, 29.31 weight percent sulfuric acid and 15.14 weight percent water. The net heat load for this conversion can be calculated from heats of reaction and dilution and corresponds to 99,176 BTUs. per ton. This compares to a heat of reaction of 195,500 BTUs. per ton for the direct production of 10-0-0-19 from unreacted urea, sulfuric acid and water. Hence, the interconversion production rate for a reactor system limited by heat exchange capacity can be 1.97 times as great as the direct production rate for 10-0-0-19.

The heats of reaction for any product can be calculated from the following expressions using the concentrations of unreacted urea and $H_2SO_4$ in both the feed solution and reactant feed, i.e., solid urea and concentrated sulfuric acid.

The overall reaction is illustrated by:

The heat of dilution of the feed solution in the reaction phase is insignificant compared to the other heat loads involved and can be ignored.

Applying these expressions to the amount of undissolved and unreacted urea and sulfuric acid added to the reaction zone will yield the amount of heat to be expected in the reaction. That value, in turn, allows the determination of production rates permissible in any system assuming the process is limited by cooling capacity.

From these expressions it can be determined that the conversion of 29-0-0-9 to 18-0-0-17 by the reaction of 62.07 percent 29-0-0-9; 35.01 percent sulfuric acid (98 percent); and 2.92 percent water produces a net heat release of 127,716 BTUs. per ton of 18-0-0-17 produced. That value is substantially less than the net heat release of 173,400 BTUs. per ton for the direct production of 18-0-0-17 from urea, sulfuric acid and water. Similarly, the conversion of a 10-0-0-19 feed solution to 18-0-0-17 by the reaction of 45.52 weight percent 10-0-0-19; 25.62 weight percent sulfuric acid (98 percent); and 28.86 weight percent urea (46 weight percent N) would cause a net heat release of 84,408 BTUs. per ton compared to 173,400 BTUs. per ton for direct production of 18-0-0-17.

The net heat of reaction can also be determined calorimetrically, rather than by calcination, by very gradually adding very small amounts of the feed solution and reactants to a calorimeter in the necessary proportions with sufficient cooling to assure that the solution temperature never exceeds the incipient decomposition temperature of either the feed solution or product. The heat release can be determined by standard calorimetric procedures.

Some interconversions are substantially endothermic. These pose a different problem in that solution temperature must be maintained at a level sufficient to promote the reaction and above the product crystallization point. When a significant endotherm is involved, for instance in the conversion of either 18-0-0-17 or 10-0-0-19 to 29-0-0-9, it can cause the system temperature to become so low that the reaction rate drops to an impractically low level. This problem can be overcome by carrying out, in effect, a combination of direct production and interconversion that will result in a net heat release sufficient to sustain the preferred minimum reaction temperature of at least about 120° F., preferably at least 130° F., and yet not exceed incipient decomposition temperature.

The balance of interconversion and direct production can be controlled so that essentially no cooling is required in which case net production rate will be limited by reaction kinetics rather than by cooling capacity. However, I presently prefer to use at least a five percent excess of direct production above that theoretically required to maintain adequate reaction rate so that cooling rate can be used as a process control variable.

The required balance of direct production and interconversion for any combination of feed and product can be calculated from the heat balance expressions discussed above. The specific heats of these systems range from about 0.35 to about 0.5. Thus, at least about 40,000, and usually about 40,000 to about 55,000 BTUs. per ton net heat release is required to obtain a reaction temperature within the defined ranges using feeds having temperatures of about 80° F. Higher heat release rates are required when it is desired to cool the reacting liquid phase during the process.

More specifically, 18-0-0-17 can be converted to 29-0-0-9 by a combination of direct production and interconversion by simultaneously adding to the reaction zone 13.20 weight percent 18-0-0-17; 33.52 weight percent urea; 45.26 weight percent sulfuric acid; and 8.02 weight percent water. The net heat output for this interconversion is 50,760 BTUs. per ton, which is sufficient to maintain the desired reaction temperature. Similarly, 10-0-0-19 can be converted to 29-0-0-9 by simultaneously adding to the reaction zone feeds in the proportions 7.08 weight percent 10-0-0-19; 60.71 weight percent urea; 23.47 weight percent sulfuric acid; and 8.74 weight percent water. The net heat output of this combination of interconversion and direct production is 59,760 BTUs. per ton.

Product and reacting liquid phase composition and reaction temperature can be controlled within the limits required by gradually and simultaneously adding the feed solution and additional reactants, e.g., urea, concentrated sulfuric acid or water, to the reaction zone at relative rates corresponding to the concentration of each component in the predetermined product composition and, when the reaction is excessively exothermic, cooling the reacting liquid phase sufficiently to maintain it at a temperature below its incipient decomposition temperature. Bulk system temperature may not accurately indicate the presence or absence of localized over-heating unless the reacting liquid phase is rapidly and thoroughly mixed during the course of the reaction. Localized over-heating and resultant incipient or violent decomposition can be avoided by the methods described herein in which the reaction is conducted in a thoroughly mixed liquid phase.

The feed rate of each component, and the composition of the reacting liquid phase should be maintained as closely as possible to its stoichiometric proportion. Thus, the concentration of each component should be maintained within about 2 percent, preferably within 1 percent or less, of its stoichiometric value.

In one preferred embodiment in which the reaction is excessively exothermic and the reacting liquid phase is removed from the reaction zone and cooled in a direct air contact countercurrent heat exchange, some water is lost from the system and must be made up by increasing the water feed rate to the reaction zone by an amount proportional to the rate of water loss in the cooler. This consideration is not as important with other types of heat exchange equipment.

The close tolerances of reactant composition and temperature will generally allow control of product crystallization temperature within 10° F., preferably within 5° F. or less, of the desired crystallization point.

In both the batch and continuous operations, the reaction zone should at all times contain at least about 0.1, usually at least about 0.2, and preferably at least about 0.5 times the hourly total feed rate of the reacting liquid phase comprising product and feed and/or preformed reaction product (during start-up). The presence of a minimum active reactor volume is necessary to prevent solidification of the reacting phase upon interaction of the feed solution and reactants, of the precipitation of solids from the resulting liquid phase. It is also essential for adequate mixing and cooling (when required), and to prevent the discharge of unreacted urea with the product withdrawn from the reaction zone, particularly in the continuous process. The higher minimum reactor volumes are preferred with the more highly exothermic reactions, and higher solid urea feed rates.

When solid urea is added in the continuous process, the active reactor volume, i.e., the reactor inventory, should be maintained at a level sufficient to assure that the urea addition rate does not exceed about 20, and is preferably less than 15, and most preferably less than about 10 lbs. of solid urea per gallon of active reactor volume per hour. The minimum reactor volume required to prevent the discharge of unreacted urea can be defined by the following expression which is unique to this reaction system:

$$V_o = \frac{u}{k}(14.3\, d^2 - 1)$$

where K is the first order rate constant for the selected product in reciprocal minutes, d is the diameter of the largest urea particles in millimeters, $V_o$ is the volume of the liquid phase within the reaction zone in gallons, and u is the production rate in gallons per minute. From this expression, it can be seen that theoretically very small active reactor volumes could be used with very small diameter urea feeds, e.g., urea dust. As a practical matter, however, volumes of about one-tenth the hourly production are usually required to provide sufficient inventory for adequate cooling (in the case of highly exothermic conversions) and for more effective process control.

The first order rate constant for any product can be determined from the expression derived from this system:

$$k = \frac{1}{t}(\ln d^2 + 2.659)$$

where t is the time in minutes required for dissolution of the type of urea employed, e.g., prills, pellets, granules, etc., in the predetermined product composition.

The dissolution rate varies with urea type, i.e., is different for prilled urea than for granular urea. Prilled urea is usually less dense and somewhat more porous than is granular urea, and is produced by forming droplets of molten urea in a prilling tower of sufficient height to allow the urea droplets to solidify during their descent. Granular ureas are usually produced by spraying molten urea onto urea "seeds" or dust in granulating apparatus such as pan or drum granulators. The largest prills and granules in most commercial ureas have diameters of at least about 1 millimeter, usually at least about 2 millimeters.

The reaction rate constant k can be determined experimentally for any given product and urea feed type by determining the rate at which the urea particle dissolves in the given product.

The reaction rate is first order and varies markedly with temperature. Experimentally observed values for the rate constants for 29-0-0-9, 18-0-0-17 and 10-0-0-19, and the effect of temperature on those rate constants using prilled urea and granular urea, are graphically illustrated in FIGS. 4 and 5, respectively.

The rate of urea dissolution can be determined by any one of several means. The data illustrated in FIGS. 4 and 5 were obtained by suspending several urea prills or granules of known diameter in the selected product at a selected temperature under mild agitation sufficient only to keep the particles suspended until they dissolved. The elapsed time within which the urea particles disappeared was determined by visual observation and was taken as the value of t for that combination of urea type and product solution. The same procedure can be used to determine the value of t, and thus the reaction rate constant K, or any combination of urea type and product composition.

Figure 4:
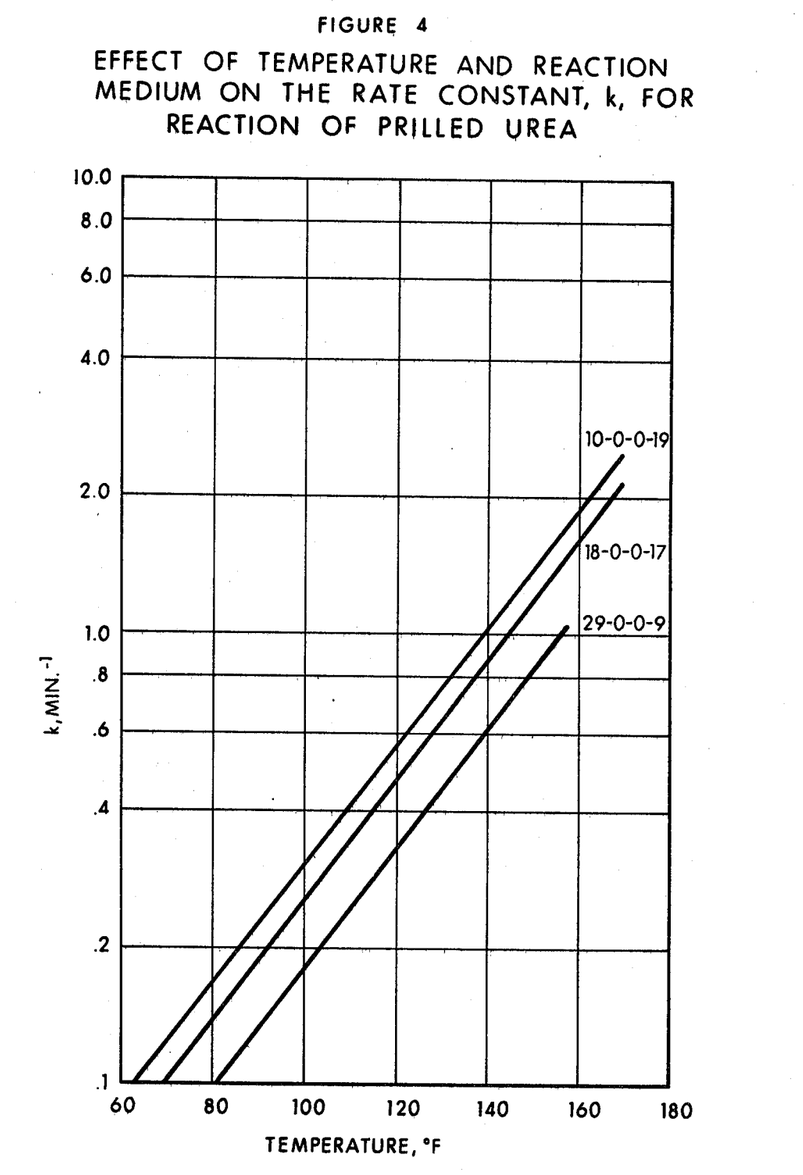
FIG. 4 is a correlation of the first order reaction rate constant in reciprocal minutes versus temperature for the three designated urea-sulfuric acid products using prilled urea feed.
Figure 5:
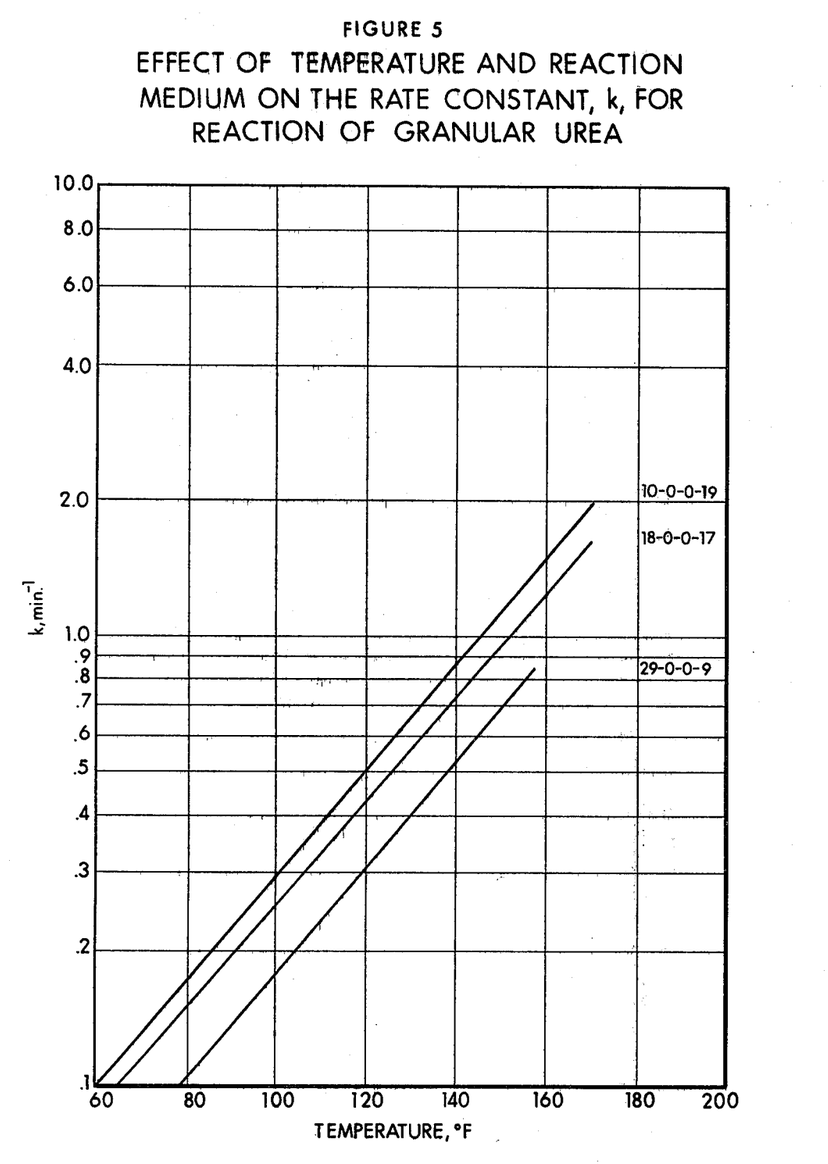
FIG. 5 is a correlation of the first order rate constant with temperature for the designated urea-sulfuric acid products using granular urea feed.

As can be seen from FIGS. 4 and 5, the reaction rate constant k diminishes remarkably with temperature. Thus, from the relationship between $V_o$ and rate constant, it can be seen that larger reactor volumes are required to obtain the same production rate of the same product at lower reaction temperatures.

Adequate control of heat load, solution temperature, composition, crystallization point and corrosivity, is particularly important in industrial scale reactors of relatively large volume in which the excess heat associated with decomposition cannot be rapidly dissipated. Most commerical systems will have reaction zone volumes of at least about 50 gallons, usually at least about 100 gallons, and most often in excess of 500 gallons. The reaction phase is relatively viscous even at reaction temperatures, and that factor, combined with the relatively low heat capacity of these compositions, makes adequate temperature control and rapid heat exchange even more difficult in the large volumes associated with commercial production.

The minor variations in the purity of commercial ureas can be sufficient to significantly affect process conditions, even though that variation ranges only from about 46 to about 46.6 weight percent nitrogen. The urea feed is preferably periodically analyzed for nitrogen content and its feed rate adjusted accordingly in view of the stoichiometry of the desired product. However, that precaution is not essential when the process is controlled as described herein, and does not eliminate the need for such control.

The sulfuric acid feed can be concentrated sulfuric acid, e.g., 94 to 98 percent, or it can be diluted with water before introduction into the reaction zone, although the amount of water cannot exceed that allowable in the predetermined product. Fuming sulfuric acid can also be used. Essentially any acid source such as spent alkylation acid is suitable. However, concentrated sulfuric acid is presently preferred due to commercial availability, the markedly higher corrosivity of more dilute acid solutions, and simplified process control. Significant acid dilution magnifies the influence of that variable on process characteristics.

If dilute acid feeds are employed, care should be taken to assure that the amount of water added with the acid feed does not exceed the amount permitted in the product. This amount varies substantially from product to product. For instance, the minimum acid concentration that can be employed for the direct production of 18-0-0-17 is 85 weight percent $H_2SO_4$. Somewhat lower acid concentration can be used for direct production of other products, e.g., 74.2 weight percent $H_2SO_4$ for 10-0-0-19 and 73.1 weight percent $H_2SO_4$ for 29-0-0-9. The use of more dilute acids will result in off-specification products unless the excess water is somehow removed from the process.

Although numerous other constituents potentially useful in the final composition may be added to the reactor, such as crop micronutrients and other compounds, it is presently preferred to produce the urea-sulfuric acid mixtures neat and make custom formulations downstream as required.

Once the continuous process is commenced, it can be run indefinitely provided that sufficient provision is made to control corrosion and that changes in product composition are not required.

In starting up the preferred embodiment of this invention for either batch or continuous operation, the minimum required product inventory can be manufactured in the vessel by interconversion, direct production, or both, by gradual addition of the feed components in stoichiometric proportions provided that sufficient cooling is available to maintain the temperature below the incipient decomposition temperature when required for highly exothermic reactions. It is presently preferred, however, to begin with an inventory of material produced in a previous operation and retrieved from storage. In either event, the initial inventory, or heel, should be of the same composition as that of the desired product so that deviations in composition, crystallization point, heat of reaction or corrosivity do not occur during the process.

As discussed above, one of the most difficult problems in the control of the highly exothermic reaction is adequate control of reaction temperature. Reaction temperature must be maintained below permissible maximums and is preferably maintained above certain minimums so that the practical operating range is relatively narrow. Even minor changes in process conditions can result in temperature excursions beyond these ranges.

The high viscosity, low specific heat, low maximum allowable temperature, high corrosivity to conventional alloys at high fluid velocity, and low water content of the products, place severe limitations on conventional heat exchange means. Nevertheless, heat exchangers of conventional designs such as shell and tube, coil, etc., can be used although they must be designed in view of the product characteristics mentioned above.

It has been found, however, that the reacting liquid phase can be adequately cooled by direct contact countercurrent heat exchange with ambient air making use of a relatively simple cooling unit design such as that illustrated in FIG. 3, and that this approach mitigates the problems associated with the high corrosivity, high viscosity and low specific heat of these compositions. It has also been found that the direct air heat exchange method adequately cools the reacting liquid phase even though it has very low vaporizable water content, and that it does so without introducing or removing uncontrollable amounts of water to or from the reaction phase or polluting the atmosphere. The critical relative humidities of these products—the relative humidity of air in contact with a given solution above which the solution will absorb water from the air—are such that the rate of water adsorption or loss of the atmosphere is not a practical problem under most ambient conditions.

The contact section of the cooler illustrated in FIG. 3 can consist of any corrosion and heat resistant shell, e.g., stainless steel, and an adequate quantity of corrosion resistant packing of any one of numerous types. Acceptable packing materials include plastic, glass, stainless steel or ceramic saddles and the like.

The design of the direct contact exchanger for any particular operation should be based upon the highest heat load anticipated which is a function of product composition and production rate, and can be established by testing different combinations of packing material, packing section design, product flow rate and air flow rate through the exchanger.

As a practical matter the packing section should have height to diameter ratio of at least about 1 and, for most packing materials, should be operated at liquid flow rates of about 25 to about 200 lbs. per hour per cubic foot of packing and air flow rates of about 25 to about 100 cubic feet per minute per cubic foot of packing material. Significantly higher liquid flow rates should be avoided to avoid flooding the cooler while higher air flow rates should be avoided to prevent excessive resistance to downward liquid flow and product carryover into the demister section.

Continuous monitoring and compensation for water removal from the system is preferred, and is necessary for precise control of composition, temperature, and corrosion. This can be achieved by monitoring product of reactor phase composition or water removal rate in the cooler, and adding water as required to the reaction zone.

It has also been found that sulfate emissions from the cooler can be controlled at levels sufficiently low that they do not constitute a pollution hazard. Sulfate emissions are primarily related to the air/liquid velocity ratio in the packing section of the cooler and are acceptably low at air/liquid velocity ratios of about 120 or less. However, they can increase significantly at air/liquid ratios substantially above that limit.

Even small variations in sulfuric acid feed concentration, or minor excursions in product composition, can produce sharp changes in the water removal rate in the direct air heat exchanger. This occurrence has a feedback effect on the overall process which alters reaction temperature and cooler efficiency and can result in unacceptable swings in product and reactant phase composition. This problem can be mitigated by monitoring the rate of water removal from the cooler as discussed above and by precise control of product composition.

Product composition can be determined by periodically sampling the product effluent and analyzing for sulfuric acid, urea and water and gradually modifying reactant feed rates as necessary to maintain specification product composition. Acid content can be determined by standard acid titration techniques, and both acid and urea concentrations can be determimed by mass spectrographic analysis, high precision infrared or liquid chromatographic analysis, or by standard wet chemical test procedures for urea and sulfuric acid. Having determined sulfuric acid and urea concentration, water can be determined by difference. Product composition is also reflected by specific gravity and refractive index. Thus, one or both of these tests can be used in combination with total acidity to determine urea and the sulfuric acid concentration while water, again, can be determined by difference.

As pointed out above, the methods of this invention are capable of producing urea-sulfuric acid reaction products containing little or no sulfamate which usually consists of sulfamic acid, ammonium sulfamate, or combinations of those compounds from feed solutions free of such contaminants. The sulfamate content can be maintained below about 0.1 weight percent or less than 0.05 weight percent, and is preferably below analytically detectable levels. Sulfamates are known herbicides, and ammonium sulfamate is registered as a herbicide under the Federal Insecticide, Fungicide and Rodenticide Act. Thus, for several reasons, the absence of sulfamates makes these compositions particularly preferred as fertilizers for animal or human food crops in contrast to previously available urea-sulfuric acid reaction products that contained significant amounts of sulfamic acid and/or ammonium sulfamate.

EXAMPLE 1

A feed solution of 18-0-0-17 was continuously converted to 10-0-0-19 using an apparatus similar to that illustrated in FIG. 3 provied with a 300 gallon stainless steel reactor and a countercurrent direct-air heat exchanger having a packing section 15 inches in diameter and 6 feet in height packed with one-inch polypropylene Intalox Saddles. The operation was commenced by adding to the reactor 100 gallons of 10-0-0-19 obtained from storage and then simultaneously feeding to the reactor the 18-0-0-17 feed solution, concentrated sulfuric acid (95.5 weight percent $H_2SO_4$) and water at the following rates: 18-0-0-17, 611.0 lbs. per hour (55.55 weight percent); sulfuric acid, 322.4 lbs. per hour (29.31 weight percent); water, 166.5 lbs. per hour (15.14 weight percent plus make-up water) until the reaction temperature reached about 130° F. Recirculation through the cooler was then commenced and product withdrawal was initiated after the active reactor volume, i.e, the total volume of product-containing reacting liquid phase, had reached 200 gallons.

The reactant feed rates were maintained at the levels defined above and product 10-0-0-19 was withdrawn from the reaction zone at a rate of 1100 lbs. per hour. Reaction temperature was maintained at 155° F. by recycling 15 gallons per minute of the reacting phase from the cooler to the reaction zone. The cooler was operated at an air rate of 193 cubic feet per minute. Net heat of reaction was 99,176 BTUs./ton 54,547 BTUs./hour).

The active reactor volume in the reaction zone was maintained at a level of approximately 250 gallons throughout the run. Product composition and water loss rate in the cooler were periodically determined and the acid, water and 18-0-0-17 feed rates were periodically adjusted in view of those determinations to maintain reactant phase and product compositions corresponding to 10-0-0-19.

EXAMPLE 2

A feed solution of 10-0-0-19 was continuously converted to 29-0-0-9 by a combination of interconversion and direct production using the apparatus and procedure described in Example 1. The interconversion of 10-0-0-19 to 29-0-0-9 is endothermic, thus reaction temperature could not have been achieved without simultansous direct production of 29-0-0-9.

One hundred gallons of 29-0-0-9 were added to the reactor and reactant and 10-0-0-19 feeds were then commenced at design rates of 77.9 pounds per hour 10-0-0-19 (7.08 weight percent), 667.8 pounds per hour prilled urea (60.71 weight percent), 258.2 pounds per hour sulfuric acid (23.47 weight percent), and 96.1 pounds per hour water. When the reaction phase temperature reached 130° F., the flow of reaction phase was commenced to the cooler which was operated at an air rate of 75 cubic feet per minute. Cooled reaction phase was recycled from the cooler to the reactor to maintain the reaction zone temperature at 130° F. and cooled product was passed to storage.

The reaction produced a net heat load of 59,760 BTUs. per ton (32,868 BTUs. per hour). Process conditions and product and reaction phase composition and properties were monitored and controlled as described in Example 1.

Numerous variations and modifications of the concepts of this invention will be apparent to one skilled in the art in view of the aforegoing description, examples and drawings. Such variations and modifications are included within the scope of this invention as defined by the following claims.

I claim:

1. A method for producing a concentrated urea-sulfuric acid reaction product of predetermined composition within the range of about 5 to about 75 weight percent urea, about 5 to about 85 weight percent sulfuric acid, and about 0 to about 35 weight percent water, wherein at least a portion of said urea and sulfuric acid are present as a member selected from the group consisting of monourea sulfate, diurea sulfate, and combinations thereof, and the combination of said urea and sulfuric acid correspond to at least about 65 weight percent of said predetermined composition, which method includes the steps of (i) simultaneously and separately feeding to the reaction zone (a) at least about 10 weight percent based on the total feed to said reaction zone of a feed solution of a urea-sulfuric acid reaction product having a composition within said range and a urea/sulfuric acid weight ratio at least about 10 percent different from that of said predetermined composition, and (b) at least about 10 weight percent based on the total feed to said reaction zone of a reactant selected from the group consisting of urea, sulfuric acid, water and combinations thereof, at least one of said reactants being selected from urea, sulfuric acid and combinations thereof, in proportions and at feed rates correlated with the differences in the concentration of said urea, sulfuric acid and water between said feed solution and said predetermined composition sufficient to produce a total feed to said reaction zone having a composition corresponding to that of said predetermined composition, (ii) maintaining in said reaction zone a weight amount of said predetermined composition corresponding to at least about one-tenth of the hourly feed rate of said total feed to said reaction zone, (iii) agitating the reacting liquid phase formed by the addition of said total feed to said reaction zone during the addition of said total feed thereto at a rate sufficient to rapidly disperse said feed in said liquid phase, (iv) maintaining the temperature of said liquid phase within the range of about 120° F. to about 176° F. and below the incipient decomposition temperatures of both said predetermined composition and said feed solution, and (v) withdrawing said reaction product of said predetermined composition from said reaction zone.

2. The method defined in claim 1 wherein (i) both of said predetermined composition and said feed solution have compositions within the range of about 10 to about 70 weight percent urea, about 10 to about 80 weight percent sulfuric acid, and about 0 to about 25 weight percent water, in which the combined weight of said sulfuric acid and urea corresponds to at least about 75 weight percent of each of said predetermined composition and said feed solution, (ii) both of said predetermined composition and said feed solution have a crystallization temperature of about 80° F. or less, (iii) said reacting liquid phase is maintained at a temperature of about 170° F. or less, and (iv) the feed rate of said feed solution corresponds to at least about 20 percent of said total feed rate.

3. The method defined in claim 1 wherein said reaction product withdrawn from said reaction zone is free of reaction-by-products selected from the group consisting of sulfamic acid, ammonium sulfamate and combinations thereof.

4. The method defined in claim 1 wherein the sulfuric acid/urea weight ratio of said feed solution is at least about 1.

5. The method defined in claim 1 wherein (i) said reactant comprises solid urea, (ii) said feed solution and said reactant are continuously and simultaneously added to said reaction zone at a combined rate equivalent to a predetermined production rate, (iii) product solution of said predetermined composition is continually removed from said reaction zone at said predetermined production rate, and (iv) the volume of said reacting liquid phase in said reaction zone corresponds at least to the value of $V_o$ determined in accordance with the expression $$V_o = \frac{u}{k}(14.3\, d^2 - 1)$$

wherein k is the first order rate constant for said predetermined product in reciprocal minutes, d is the diameter of the largest urea feed particles in millimeters, $V_o$ is the volume of said reacting liquid phase within said reaction zone in gallons, and u is the production rate from the reaction zone in gallons per minute.

6. The method defined in claim 1 wherein said feed solution comprises at least about 20 weight percent of said total feed, said reactant comprises at least about 20 weight percent of said total feed, and said total feed consists essentially of said feed solution and said reactant.

7. The method defined in claim 2 wherein said feed solution and said reactant, in combination, comprise unreacted sulfuric acid and urea in amounts sufficient to exothermically react with each other within said reaction zone to autogenously produce within said reaction zone a reaction temperature of at least about 120° F.

8. The method defined in claim 7 wherein the amount of said unreacted sulfuric acid and urea contained in the combination of said feed solution and said reactant is sufficient to autogenously produce a temperature in said reaction zone in excess of 170° F., and said reacting liquid phase is continually cooled during said reaction to maintain said reaction temperature at a level of about 170° F. or less.

9. The method defined in claim 1 wherein (i) said reactant comprises solid urea, (ii) said feed solution and said reactant are continuously and simultaneously added to said reaction zone at a combined rate equivalent to a predetermined production rate, (iii) production solution of said predetermined composition is continually removed from said reaction zone at said predetermined production rate, (iv) the volume of said reacting liquid phase maintained in said reaction zone corresponds to at least about 0.2 times the hourly predetermined production rate, and (v) said feed solution and said reactant, in combination, contain sufficient unreacted sulfuric acid and urea to exothermically react within said reaction zone and autogenously maintain said reacting liquid phase at a temperature of at least about 120° F.

10. The method defined in claim 9 wherein (i) said predetermined composition has a crystallization temperature of about 80° F. or less, (ii) the quantity of said unreacted sulfuric acid and urea contained in said feed solution and said reactant is sufficient to autogeneously maintain said reacting liquid phase at a temperature in excess of about 170° F., and (iii) said reacting liquid phase is continuously cooled during the course of said reaction to maintain the temperature thereof at a level of about 170° F. or less.

11. The method defined in claim 10 wherein said reacting liquid phase is cooled by continuously removing a portion of said reacting liquid phase from said reaction zone and cooling the removed portion by direct contact with ambient air, returning at least a portion of the resultant cooled liquid phase to the reaction zone, and discharging the resultant heated air to the atmosphere.

12. The method defined in claim 11 further comprising the steps of determining (i) the quantity of water removed from said reacting liquid phase as a result of said direct contact with said ambient air and (ii) the concentrations of urea, sulfuric acid and water in a member selected from the group consisting of said reacting liquid phase, said product solution, and combinations thereof, and adjusting the urea, sulfuric acid and/or water feed rates to said reaction zone responsive to the determinations of items (i) and (ii) as required to maintain the composition of said product solution at said predetermined composition.

13. The method defined in claim 1 wherein the urea/sulfuric acid weight ratio in said feed solution is at least about 20 percent less than the urea/sulfuric acid weight ratio in said predetermined composition, and said reactant comprises solid urea.

14. The method defined in claim 1 wherein the urea/sulfuric acid weight ratio of said feed solution is at least about 20 percent greater than the urea/sulfuric acid weight ratio of said predetermined composition, and said reactant comprises concentrated sulfuric acid.

15. The method defined in claim 1 wherein said reactant comprises urea, sulfuric acid and water in amounts in excess of the amount of reactant required to convert said feed solution to said predetermined composition, the proportions of said urea, sulfuric acid and water in said excess reactant correspond stoichiometrically to the proportions of urea, sulfuric acid and water, respectively, in said predetermined composition, and said excess reactant is reacted within said reaction zone to directly form said predetermined composition in said reaction zone.

16. The method defined in claim 15 wherein the urea/sulfuric acid weight ratio of said feed solution is less than the urea/sulfuric acid weight ratio in said predetermined composition, and said excess reactant constitutes at least about 10 weight percent of the total feed to said reaction zone.

17. A method for producing a concentrated urea-sulfuric acid reaction product of predetermined composition within the range of about 5 to about 75 weight percent urea, about 5 to about 85 weight percent sulfuric acid, and about 0 to about 35 weight percent water, wherein at least a portion of said urea and sulfuric acid are present as a member selected from the group consisting of monourea sulfate, diurea sulfate, and combinations thereof, and said urea and said sulfuric acid, in combination, constitute at least about 65 weight percent of said predetermined composition, which method includes the steps of (i) continuously, simultaneously and separately feeding to a reaction zone (a) at least about 10 weight percent, based on the total feed to said reaction zone, of a feed solution of a urea-sulfuric acid reaction product having a composition within said range and a urea/sulfuric acid ratio of at least 10 percent different from that of said predetermined composition, and (b) at least about 10 weight percent based on the total feed to said reaction zone of a reactant selected from the group consisting of urea, sulfuric acid, water, and combinations thereof, at least one of said reactants being selected from urea, sulfuric acid, and combinations thereof, in proportions and at feed rates correlated with the differences in the concentration of said urea, sulfuric acid and water between said feed solution and said predetermined composition and sufficient to produce a total feed to said reaction zone having a composition corresponding to that of said predetermined composition, (ii) maintaining within said reaction zone a weight amount of a reacting liquid phase formed by the admixture of said feed solution and said reactant corresponding to at least about 0.2 times the hourly feed rate of said total feed to said reaction zone, (iii) agitating the reacting liquid phase formed by the addition of said total feed to said reaction zone during the addition of said total feed to rapidly disperse said feed solution and said reactant within said reaction zone, (iv) maintaining the temperature of said reacting liquid phase within the range of about 120° F. to about 176° F. and below the incipient decomposition temperature of both of said predetermined composition and said feed solution, and (v) continuously withdrawing said reaction product of said predetermined composition from said reaction zone.

18. The method defined in claim 17 wherein said reactant comprises urea, sulfuric acid and water in excess of the amount of said reactant required to convert said feed solution to said predetermined composition, the proportions of said urea, sulfuric acid and water in said excess reactant correspond stoichiometrically to the proportions of said urea, sulfuric acid and water in said predetermined composition, and said excess reactant constitutes at least about 10 weight percent of the total feed to said reaction zone and is reacted exothermically in said reaction zone to form said predetermined composition.

* * * * *